Jan. 4, 1949. A. L. BROWNLEE 2,458,336
FIELD MAGNET UNIT FOR FLYWHEEL MAGNETOS
Filed July 16, 1947 2 Sheets-Sheet 1
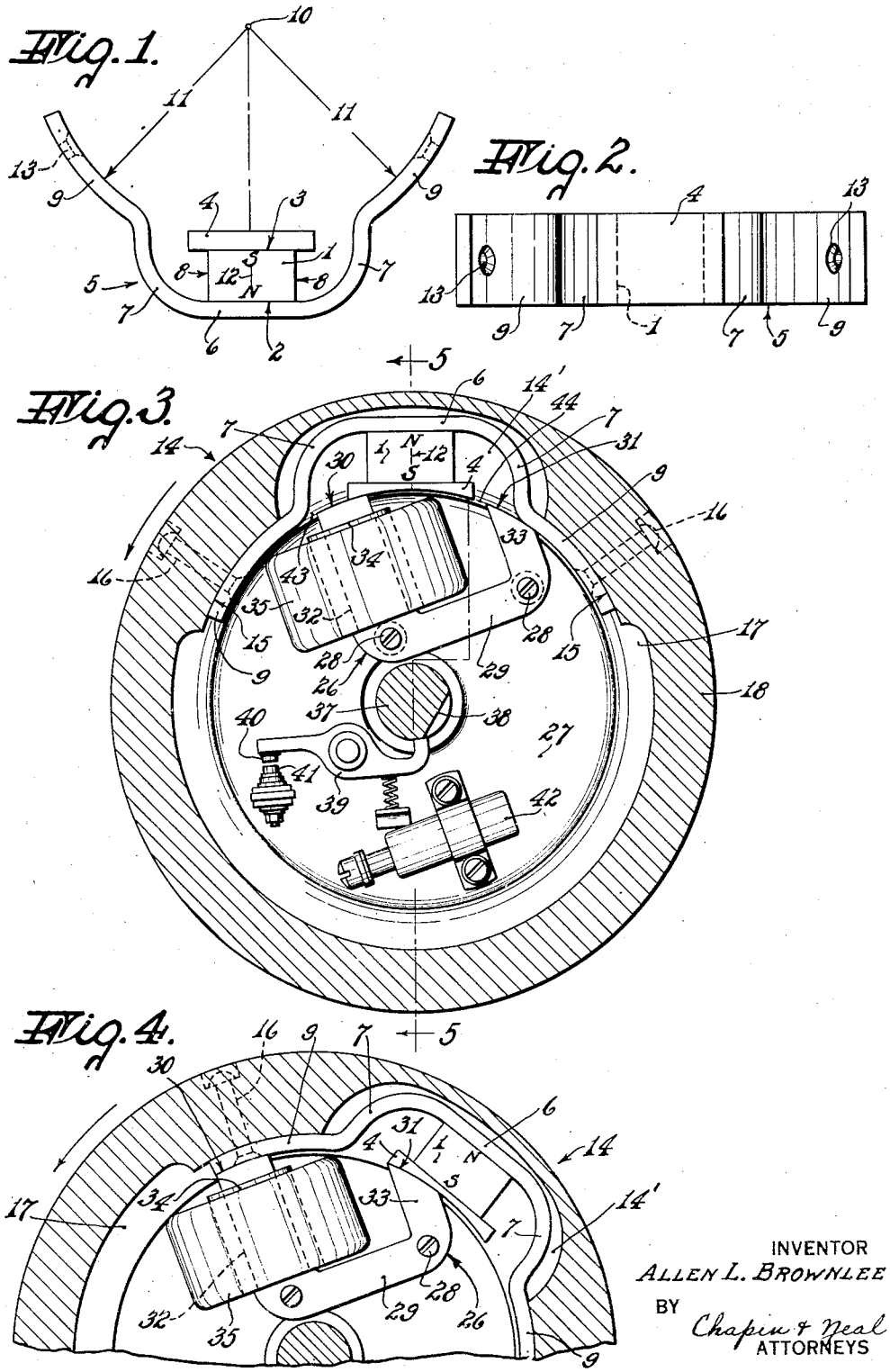
INVENTOR
ALLEN L. BROWNLEE
BY
Chapin & Neal
ATTORNEYS Jan. 4, 1949.  A. L. BROWNLEE  2,458,336
FIELD MAGNET UNIT FOR FLYWHEEL MAGNETOS
Filed July 16, 1947  2 Sheets-Sheet 2
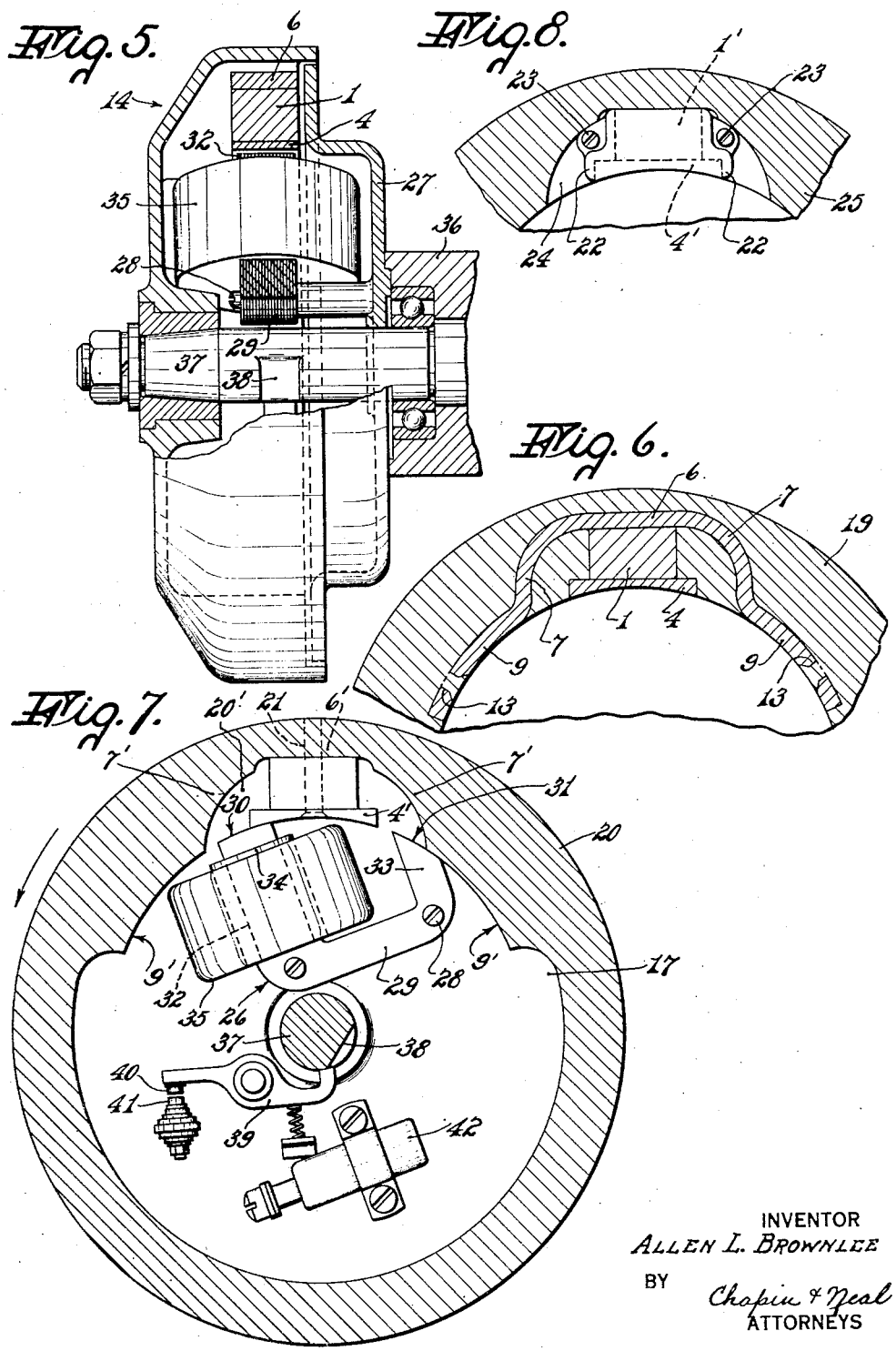
INVENTOR
ALLEN L. BROWNLEE
BY Chapin & Neal
ATTORNEYS Patented Jan. 4, 1949

2,458,336

UNITED STATES PATENT OFFICE 2,458,336

FIELD MAGNET UNIT FOR FLYWHEEL MAGNETOS

Allen L. Brownlee, West Springfield, Mass., assignor to Wico Electric Company, West Springfield, Mass., a corporation of Massachusetts Application July 16, 1947, Serial No. 761,283

3 Claims. (Cl. 171—209)

1

This invention relates to a flywheel magneto and, more particularly, to an improved magnetic rotor therefor including a field magnet unit, which may be constructed separately from the engine flywheel for mounting thereon by the engine manufacturer.

The invention has for one object to provide a field magnet unit with an improved arrangement of three pole shoes and a single magnet for use in the flywheel of a flywheel magneto.

The invention also has for an object the provision of a field magnet unit, involving a single magnet and pole shoes, which unit may be manufactured in quantities at low unit cost.

These and other objects and advantages will best be understood in connection with the description of examples of the invention in connection with the accompanying drawings, in which:

Figs. 1 and 2 are side elevational and plan views, respectively, of a field magnet unit embodying the invention;

Fig. 3 is a cross sectional view showing the field magnet unit mounted in an engine flywheel in cooperative relation with the stator of a flywheel magneto;

Fig. 4 is a view, taken similarly to Fig. 3 but showing the flywheel and magnetic unit in a different position relatively to the magneto stator;

Fig. 5 is a sectional elevational view taken on the line 5—5 of Fig. 3;

Fig. 6 is a fragmentary cross sectional view of a die-cast engine flywheel showing the field magnet unit embedded therein;

Fig. 7 is a cross sectional view of a cast iron flywheel embodying the invention; and Fig. 8 is a fragmentary view, taken similarly to Fig. 7 but showing a different way of fastening the field magnet unit to the flywheel.

Referring to these drawings; the invention provides a field magnet unit which may be secured to the flywheel of an internal combustion engine to form a magnetic rotor for cooperation with the stator of a magneto, supported from the engine block. This unit is shown apart from the engine flywheel in Figs. 1 and 2 and as incorporated in the engine flywheel in Figs. 3 to 8, inclusive.

Referring first to Figs. 1 and 2, the field magnet unit includes a relatively short, permanent magnet 1 which is of high coercive material and which has flat polar end faces. In the particular form shown, the magnet is of rectangular cross section and its width and thickness exceed its length as measured from one polar end face 2 to the opposite polar face 3. The particular cross

2 sectional shape of the magnet is not, however, important. Secured to the polar face 3 in any suitable way is a pole shoe 4, which as shown is of rectangular cross section and may, for example, be made of a short length cut from a straight bar of soft steel. This pole piece may, for example, be held to the magnet 1 by brazing. Secured in the same or any suitable way to the other polar face 2 of the magnet is a member 5 of magnetic material. This member has a central part 6, which is secured to the magnet, and two other parts 7, which extend one from each end of part 6 outwardly one along each of two opposite sides 8 of the magnet in spaced relation therewith and terminate with parts 9, which extend one from each outer end of each part 7 in outwardly diverging relation. These parts 9 form pole shoes curved from a common center 10 with the same radius, such as 11. The shoes 9 have the same polarity and a polarity opposite to that of shoe 4 and are angularly spaced one on each side of shoe 4. The polar axis 12 of magnet 1 coincides with a radial line passing through the center 10 and located at right angles to the plane of the polar end faces 2 and 3 of the magnet. The flaring parts 9 of the unit may have holes 13 therethrough for receiving any suitable fastening means.

The application of the invention to a flywheel 14 is shown in Fig. 3. The flywheel has a deep recess 14' to receive the unit except for the flaring ends 9 and has surfaces 15 curved coaxially with the flywheel to receive the correspondingly curved parts 9. The parts 9 may then be clamped against the surfaces 15 in any suitable way as for one example by the rivets 16 shown. The pole shoes 4 and 9 are then finished, as by turning, to provide surfaces which are in true coaxial relation with the flywheel. If the flywheel is of magnetic material, it should be recessed, as at 17, to provide for a wide gap between the portion 18 of the flywheel and the stator pole pieces, later to be described, while passing such pole pieces.

The same unit may be die cast into the flywheel as shown in Fig. 6. Here the flywheel 19 is of non-magnetic metal, such for example, as aluminum, and such metal may flow through the holes 13 to bind the shoes 9 in place and preferably also around the parts 6 and 7 of member 5 as well as around the magnet 1 and the sides of pole piece 4, leaving only the curved surfaces of the pole shoes 4 and 9 exposed.

In Fig. 7, the invention is embodied in another different form in a flywheel 20 of magnetic material, such for example, as a cast iron flywheel.

In this example, part of the iron casting is utilized to form the pole shoes 9' and the parts 7' and 6' which connect such shoes to one polar end of the magnet 1'. The magnet 1' has on its other end a rectangular pole shoe 4', which may be of soft steel as formerly. A deep recess 20' is formed in the flywheel to receive the magnet 1' and provide adequate space between the sides of the magnet and the parts 7'. The outer wall of recess 20' is a flat surface, against which one polar end of the magnet abuts. The magnet 1' and shoe 4' may be held together and to the flywheel by suitable means, such as a screw 21, which passes through the shoe and lengthwise through the magnet and threads into the flywheel. The flywheel should be recessed at 17 for the purpose, above described.

The magnet 1' and its shoe 4' may likewise be held together by non-magnetic metal 22, which encompasses the sides of the magnet and the sides of the shoes. This is effected by die casting. In the die casting, holes are formed, through which fasteners, such for example, as the filister head screws 23, are passed to clamp the unit against an end wall 24 of the recess 20' in the flywheel 25.

The magnetic rotor, thus formed, is designed to cooperate with a suitable magnetic stator, such for example as that shown in Phelon Patent No. 2,392,500, granted January 8, 1946. The essential parts of this stator have been indicated in Figs. 3 and 5. An approximately U-shaped member 26 of iron laminations is secured to a non-magnetic support 27 as by screws 28 which pass through the cross bar portion 29 of the member and thread into the support. The end faces 30 and 31 of the two legs 32 and 33 of the U-shaped member are curved to cooperate with the shoes 4 and 9. One of these legs 32 bears primary and secondary coils 34 and 35 respectively. The support 27 is suitably fixed to the engine crankcase 36 and the flywheel is fixed to the engine crankshaft 37. The crankshaft has a cam 38 thereon for actuating a breaker lever 39, carrying a breaker point 40 for cooperation with a fixed breaker point 41—both lever and point 40 being suitably mounted on the support 27, as is also the usual condenser 42. The details of the mounting of these parts has not been shown and need not be described, being fully disclosed in said patent.

In operation, the flywheel, or magnetic rotor, revolves counter clockwise, as viewed in Figs. 3 and 4. As the rotor revolves, it reaches a position, such as that shown in Fig. 4, where the surface 30 of leg 32 connects with the left hand pole shoe 9. A circuit from the north pole of magnet 1 through part 6, the left hand part 7, left hand shoe 9, leg 32, cross bar 29, leg 33, and pole shoe 4 to the south pole of the magnet is established. The breaker points 40 and 41 engage at this time to close an electric circuit through the primary coil 34 for the purpose of resisting change of flux in the magnetic circuit described. As the rotor continues to turn, it reaches the position shown in Fig 3, in which the surface 30 of core 32 connects with pole shoe 4 and the surface 31 of leg 33 connects with the right hand pole shoe 9. A magnetic circuit is now established from the north pole of magnet 1 through part 6, right hand part 7, right hand pole shoe 9, leg 33, cross bar 29, core 32 and pole shoe 4 to the south pole of the magnet. The magnetic circuit, theretofore existing, is broken by the air gaps at 43 and 44. At this time, the breaker points 40 and 41 are separated by cam 38 and the flow of magnetic flux through core 32 is suddenly reversed to provide for the generation of an electromotive force in coil 35.

It should be noted that, when the left hand shoe 9 and the shoe 4 move into the Fig. 4 position, the flux is built up so gradually that no spark is produced even though the breaker points 40 and 41 are separated at the time. There is a large leakage of flux due to the large exposed area of the laminated member 26. This leakage also reduces the maximum build-up of flux in the Fig. 4 circuit. Some of the flux from the magnet 1 can leak from the right hand shoe 9 and the adjacent part of right hand part 7 to the leg 33 and the adjacent part of cross bar 29 to reduce the amount of flux in the circuit through core 32. The break in the circuit is, however, quick and sharp. When the rotor is in the Fig. 3 position, there is a little leakage from the left hand shoe 9 to the member 26 and nearly all the flux from the magnet 1 will flow through core 32. The flux flow through core 32 in the Fig. 3 direction is maintained for a substantial interval, while the surfaces 30 and 31 remain respectively connected with shoe 4 and right hand shoe 9. Then, as these surfaces simultaneously become disconnected from these shoes, there is a rather quick magnetic change as the flux flow through core 32 is reduced to zero. Any electromotive force produced by this flux change while the breaker points are open will do no harm as it occurs late in the firing stroke of the engine, after the spark produced at the Fig. 3 position of the rotor has ignited the charge.

The invention provides a field magnet unit, which can be sold separately as such for application to engine flywheels by the engine manufacturer. It has been common practice, heretofore, for the magneto manufacturer to furnish the flywheel with the magnetic elements built into it. While this practice has the advantage that the magneto manufacturer has complete control of the construction and mounting of all the parts which make up the magneto, there is the disadvantage, in the case of the heavier flywheels, of heavy freight charges and particularly, when the flywheels have to be shipped long distances, as across the country. The present invention provides a unit which is of light weight in comparison with the flywheel. These units can be shipped long distances at low cost and this makes an appeal to many engine manufacturers.

The invention also provides a field magnet which may be manufactured at low cost. The magnet may be cast in the form shown and no machining of it is required although it is desirable that the polar faces 2 and 3 should be brushed smooth, as by a belt sander, to remove any pimple-like protuberances and provide a smooth surface in order to secure good magnetic contact with the pole shoes. These shoes may be of soft steel. The shoes 4 are simply cut from a straight flat bar. The shoes 9 and the connecting parts 7 and 6 may be formed from a bar of soft steel pressed into shape in a die. The parts may be fastened together by brazing without injury to the magnetic qualities of the magnet. It is to be noted that magnetic pull and centrifugal force both tend to hold the shoes and magnet together. In the manufacture of this unit, it is not necessary to work with close tolerances. For example, a tolerance of a thirty-second of an inch in any direction in any of the three parts will not be excessive. The polar surfaces 2 and 3 of the magnet need not be exactly parallel. The finishing of the shoes 4 and 9, by grinding, after the unit is assembled in the flywheel provides the desirable close fit and coaxial relation of the rotor shoes with the pole pieces of the stator. The thickness of part 6, the length of the magnet 1, and the thickness of shoe 4 may vary to produce variations in the overall radial dimension of the connected parts but the final grinding operation will locate the curved surface of shoe 4 in true coaxial relation with the flywheel and at the proper radial distance from the axis of rotation of the flywheel.

I claim.

1. A three-pole magnetic rotor for a flywheel magneto, comprising in combination, a flywheel rotatable about an axis, two pole shoes of magnetic material having curved polar surfaces of equal radius coaxial with the flywheel and angularly spaced about said axis, a single pole shoe of magnetic material located intermediate the first-named pole shoes and having a curved polar surface of said radius coaxial with the flywheel and having its ends angularly spaced from the adjacent ends of the first-named pole shoes, a single permanent magnet having a straight polar axis located radially of the flywheel and having one polar end fixed to said single pole shoe, and magnetic connections between the other polar end of said magnet and each of the first-named pole shoes, whereby the latter are of like polarity and of a polarity opposite to said intermediate shoe, said shoes being successively different in polarity in the direction of revolution of the rotor.

2. A three-pole field magnet unit for flywheel magnetos, comprising, two pole shoes of magnetic material having part-cylindrical polar surfaces which are curved from the same axis and are of equal radius, said shoes being angularly spaced with reference to said axis, a single pole shoe of magnetic material located between the first-named pole shoes at substantially the same distance from said axis and angularly spaced with reference to said axis from each of the first-named pole shoes, a single permanent magnet having a straight axis which interconnects its polar ends and which is located radially with respect to said axis and between the two first-named shoes, said intermediate shoe being directly fixed to one polar end of said magnet, and magnetic connections between the other polar end of said magnet and each of the first-named pole shoes.

3. A three-pole field magnet unit for flywheel magnetos, comprising, a bar of magnetic material in the form of a U with wings which are connected one to the outer end of each leg portion of the U and which flare outwardly in opposite directions from such ends in outwardly diverging relation, said wings having part-cylindrical surfaces which are curved from a common axis and are of equal radius and angularly spaced one from the other about said axis, a single permanent magnet having a straight line axis interconnecting its polar ends, said magnet being located radially with reference to the first-named axis and between the two leg portions of said U, and one polar end of said magnet being fixed to the cross bar portion of the U centrally thereof, and a single pole shoe of magnetic material located intermediate the first-named pole shoes at substantially the same radial distance from said first-named axis and having its ends angularly spaced one form each of the adjacent ends of the first-named pole shoes, said intermediate shoe being fixed to the other polar end of said magnet.

ALLEN L. BROWNLEE.

REFERENCES CITED

The following references are of record in the file of this patent:

UNITED STATES PATENTS

| Number | Name | Date |
| --- | --- | --- |
| 732,364 | Mears | June 30, 1903 |
| 2,200,612 | Woodruff | May 14, 1940 |
| 2,392,500 | Phelon | Jan. 8, 1946 |

FOREIGN PATENTS

| Number | Country | Date |
| --- | --- | --- |
| 495,813 | Great Britain | Nov. 21, 1938 |
| 508,347 | Great Britain | June 29, 1939 |
| 791,283 | France | Sept. 23, 1935 |